Patented June 16, 1925.

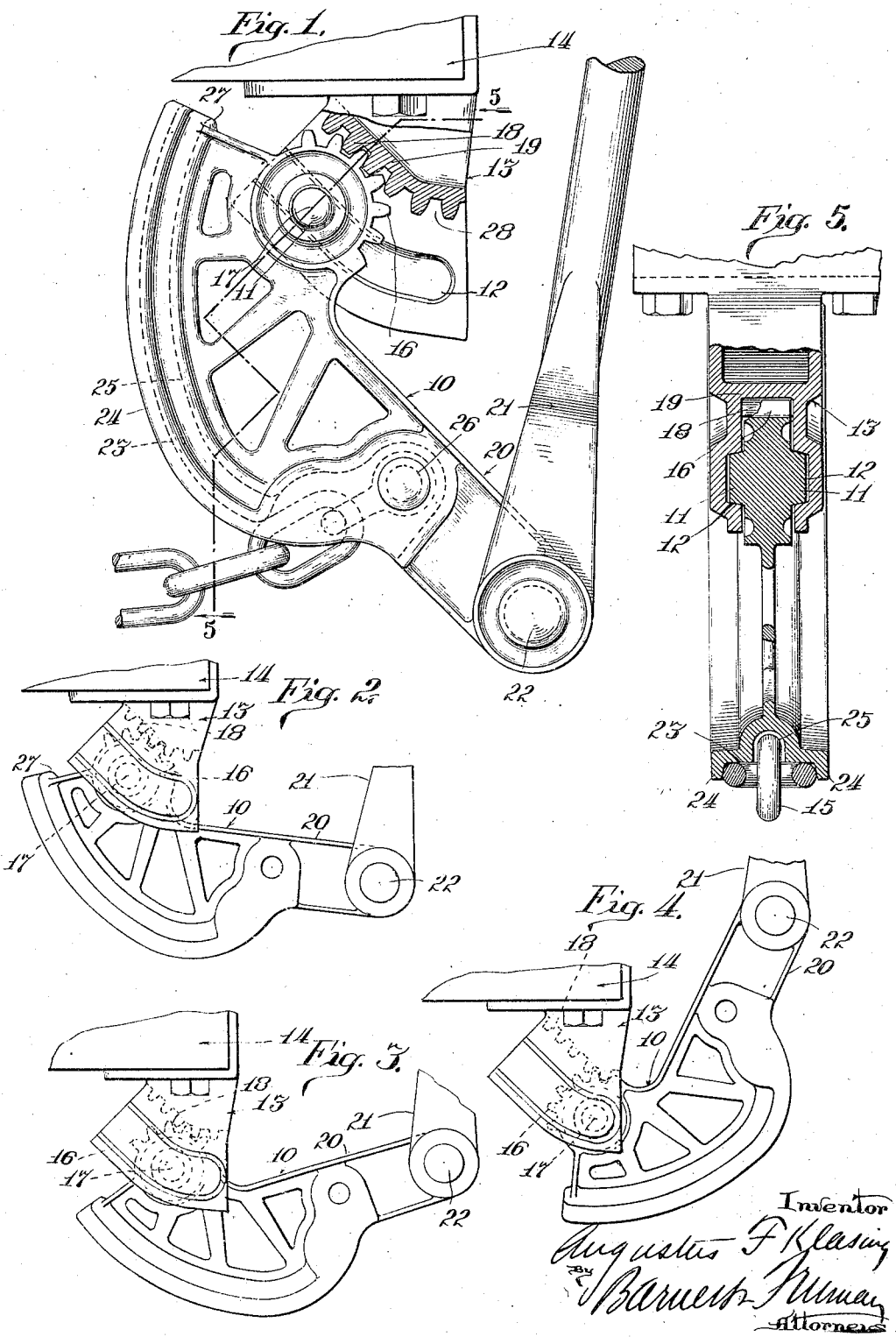

1,542,062

UNITED STATES PATENT OFFICE.

AUGUSTUS F. KLASING, OF CHICAGO, ILLINOIS, ASSIGNOR TO THE KLASING CAR BRAKE COMPANY, A CORPORATION OF COLORADO.

BRAKE-OPERATING MECHANISM.

Application filed June 17, 1921, Serial No. 478,258. Renewed January 24, 1923.

*To all whom it may concern:*

Be it known that I, AUGUSTUS F. KLASING, a citizen of the United States, residing at Chicago, in the county of Cook and State of Illinois, have invented certain new and useful Improvements in Brake-Operating Mechanism, of which the following is a specification.

This invention relates to improvements in certain types of power transmitting devices, particularly adapted for use with brake operating mechanisms for railway cars and the like, and has for an object to improve the operation of such power transmitting devices in order to reduce friction and to prevent the binding or locking of the parts in transmitting power.

A further object is to lessen the reduction in effective lever ratios, in such power transmitting devices, at the time when the greatest force is being transmitted.

The invention consists in the novel constructions, combinations, and arrangements, to be hereinafter described and claimed, for carrying out the above stated objects, and such other objects as will appear from the following description.

The invention is illustrated in a preferred embodiment in the accompanying drawings, wherein Fig. 1 is a side elevation, partly in section, showing one of the power transmitting devices applied to the lower corner of a railway car or the like, and connected to the brakes and brake operating mechanism (not shown);

Figs. 2, 3 and 4 show successive positions of the power transmitting device as it rolls down the inclined rack while transmitting force from the brake-operating mechanism to the brakes; and Fig. 5 is a transverse section taken along the line 5—5 of Fig. 1.

Like characters of reference designate like parts in the several figures of the drawing.

The type of power transmitting devices above referred to is illustrated and described in certain of my prior copending applications Serial Nos. 220,467 and 260,018, and consists in general of a rocking element or bell crank having gear teeth thereon, and adapted to roll down an inclined rack in transmitting force from the brake-operating mechanism to the brakes. There has been a tendency in the earlier forms of this type of device for the brake chain to attempt to draw the gear teeth out of mesh with the rack because of the greater effective pull of the brake chain as compared with the opposing pull of the operating mechanism. In view of the clearance necessarily allowed between the gear teeth and rack, this tendency caused the gear teeth to bind or lock, and interfered with the free rolling motion of the power transmitting device. This tendency to lock and bind was increased by the fact that the gear teeth were of an elementary outline, being formed on the arcs of circles with centers on the pitch line of the gear.

Referring now to the drawings, the power transmitting device 10 is provided with a pair of trunnions 11 extending from opposite sides of the device and adapted to travel in the inclined guideways 12 formed in the bracket 13. The bracket 13 is suitably secured to the lower part of a car 14, in line with the brake chain 15. The bell crank is formed with a series of involute or cycloidal gear teeth 16 about the center 17 of the trunnions 11. These gear teeth are adapted to mesh with similarly shaped gear teeth 18 on a rack 19 formed on the bracket and inclined downwardly and outwardly. The power transmitting device is adapted to roll along the rack and the trunnions 11 are adapted to travel in the guideways 12, these guideways serving to retain the gear teeth in mesh and maintain proper tooth clearance.

The power transmitting device is formed with an arm 20 to which a rod 21 or other tension element is pivotally connected at 22. The member 21 extends upwardly to a suitable brake operating mechanism (not shown) which is adapted to raise and lower the element 21 during the setting or releasing of the brakes. The power transmitting element 10 is also formed with a curved winding surface 23, on which the brake chain 15 is adapted to wind during the setting of the brakes. This winding surface is preferably provided with side flanges 24 and a groove 25 for the chain. The chain is suitably connected to the device 10 at 26. The curvature of the winding surface 23 with respect to the center 17 is preferably designed to effect the greatest take-up of the brake chain during the initial rocking movement of the power transmitting device. The distance of the surface from the center 17 preferably decreases towards the end 27 of the device, so as to permit the application of greater force to the brakes when the brake shoes engage the wheels. This occurs when the slack has been removed from the brake mechanism, and the brake shoes are brought to bear against the wheels. At this time the necessity for take-up is a minimum and the necessity for increased force is a maximum.

In this connection it will be noted by reference to Figs. 2, 3 and 4 that the effective lever arm between the member 21 and the point of pivoting of the transmitting element progressively decreases as the device rolls down the inclined rack. In order to prevent the decrease of the ratio between these progressive lever arms and the distances between the pivot point and the tangent point of the chain 15, the winding surface 23 is designed so that these distances progressively decrease toward the end 27, as shown in Fig. 1. This prevents a decrease in the force transmitted to the chain 15 by reason of a decrease in this effective lever ratio. By pivot point is meant the point or tooth about which the device rocks at any given instance. When the brake shoes engage the wheels, the matter of rapidity of take-up is not important but it is of prime importance that the operating mechanism exert as large a force as possible on the brake shoes. It is, of course, possible by a suitable design of the winding surface to make the lever ratio referred to, either increase or decrease as the transmission element rolls along the rack. A progressive increase in this ratio will, of course, enable the transmission of a greater force to the brake chain, but this is accomplished only by decreasing the effective range of take-up of the device. It is, therefore, necessary in designing such a device to consider both the desired lever ratios and the range of take-up of the winding surface.

In order further to increase somewhat the effective force delivered to the brake shoes, the direction of inclination of the rack is changed, as shown at 28, so as to decrease the rate of travel of the device 10 downwardly and away from the brake operating mechanism. This decreases the work involved in rolling the device down the rack, and consequently increases the force delivered to the brake chain 15, at the same time decreasing the rate of take-up. As pointed out above, however, the necessity for a great amount of take-up at this point is unimportant. The decrease in the inclination of the rack 19 toward the end of the travel of the device 10 also has the effect of overcoming the tendency of the brake chain to pull the gear teeth out of mesh. This tendency occurs in prior devices because the lever ratios are preferably designed so that the pull along the chain 15 when the brake shoes come against the wheels is greater than the pull along the rod 21 and therefore not balanced by the latter. It will be noted from an inspection of Fig. 4 that the line of pull of the brake chain is more nearly at right angles to the gear teeth which are in mesh, and therefore there is little or no tendency to pull these teeth out of mesh and cause the same to bind or lock.

The friction between the gear teeth is also reduced by employing involute or cycloidal teeth, instead of the elementary round-ended teeth. The latter type of teeth not being theoretically correct teeth, increase the rubbing and friction between the surfaces as the device travels along the rack. This feature is not important as long as the device is only taking up slack, but when the brake shoes bear against the wheels, the delivery of a great amount of force greatly increases the friction at the time when it is essential that it deliver as much pressure as possible against the brake shoes.

The operation of the device will be readily understood from the foregoing description. It is sufficient to note that the device is designed so that in the average type of car the brake shoes come against the wheels when the rocking element 10 is in the position shown in Fig. 3; that is, when the gear has just meshed with the portion of the rack of decreased inclination. The position shown in Fig. 4 is not usually reached unless there is a great amount of slack and the brake shoes are considerably worn.

The term "involute" is employed in the claims for the sake of brevity to designate the outline of gear teeth which roll instead of slide over the surfaces of each other.

I claim:

1. In brake operating mechanism, the combination of members angularly disposed with respect to one another and each movable in substantially the direction of its length, a rolling element to transmit movement from one of said members to the other and a fixed member on the car upon which the aforesaid element rolls in a path inclined downwardly away from the brakes, the inclination of which is less as said element approaches the limit of its travel.

2. In brake operating mechanism, the combination of members angularly disposed with respect to one another and each movable in substantially the direction of its length, a rolling element to transmit movement from one member to the other formed with teeth, and a rack fixed to the car and inclined downwardly and outwardly, the inclination of the pitch line of which is greater at its upper end than at its lower end.

3. In brake operating mechanism, the combination of members angularly disposed with respect to one another and each movable in substantially the direction of its length, a rolling element to transmit movement from one member to the other formed with teeth, and a rack fixed to the car the teeth of which are formed on pitch lines having different inclinations, for the purpose described.

4. In brake operating mechanism, the combination of tension members angularly disposed with respect to one another and each movable in substantially the direction of its length, a rolling transmission element connected with said members for transmitting force from one of said members to the other, a fixed path along which said element moves, said path being inclined so that said element travels in a direction opposed to the direction of movement of said members, the inclination of said path decreasing with respect to the member to which the force is transmitted, as said element approaches the limit of its travel.

5. In brake operating mechanism, the combination of tension members angularly disposed with respect to one another and each movable in substantially the direction of its length, a rolling transmission element connected with said members for transmitting force from one of said members to the other, a fixed path along which said element moves, said path being inclined so that said element travels in a direction opposed to the direction of movement of said members, said path changing direction toward the end thereof, so that the rate of travel of said element away from the member transmitting the force decreases as said element approaches the limit of its travel.

6. In brake operating mechanism, the combination of tension members angularly disposed with respect to one another and each movable in substantially the direction of its length, a rocking transmission element having gear teeth connected with said members for transmitting force from one of said members to the other, a fixed rack along which said element is adapted to travel, said rack being inclined to said members and arranged to permit said element to travel away from the direction of movement of said element in transmitting force, the inclination of said rack to the member to which the force is transmitted decreasing toward the end of said rack.

7. In brake operating mechanism, the combination of members angularly disposed with respect to one another and each movable in substantially the direction of its length, a rolling element for transmitting movement from one member to the other and formed with involute gear teeth, a rack having involute gear teeth fixed to the bar and along which said element is adapted to roll, the teeth of said rack being formed on fixed lines having different inclinations, for the purpose described.

8. In brake operating mechanism, the combination of a vertically movable tension member, a flexible tension member movable substantially horizontally, a rolling transmission element to which said members are connected at points removed from the center of rotation, an inclined path on which said element is adapted to roll in transmitting force, said element provided with a curved winding surface on which said flexible member is adapted to wind, the curvature of said surface being such as to prevent a decrease in the ratio of the lever arms of said members about the center of rotation as said element rolls along its path.

9. In brake operating mechanism, the combination of members angularly disposed with respect to one another and each movable substantially in the direction of its length, a device for transmitting movement between said members comprising a rolling transmission element having means removed from its center of rotation to which said members are connected, a fixed path along which said element is adapted to roll in transmitting movement, said element provided with a curved surface upon which one of said members is adapted to wind, said surface being so arranged as to maintain the ratio of the lever arms of said members about the point of rotation substantially constant.

10. In combination with a railway car and its brake rigging including a flexible element under the car body, mechanism for operating the brakes comprising a rocking element under the car body and fulcrumed at one end thereon with its other end projecting from said car body, and a substantially vertical operating member movable in the direction of its length and attached to the projecting end of said rocking element, said flexible element being attached to the rocking element adjacent the place of attachment thereto of the operating member, and the rocking element being formed with a winding surface for the flexible element which is curved from the place of attachment of said flexible element so as to gradually approach the fulcrum point of the rocking element, on which surface the flexible element bears when the rocking element is rotated in the direction to set the brakes.

11. In combination with a railway car and its brake rigging, including a flexible element under the car body, mechanism for operating said brakes comprising a member which is mounted on the car so as to rotate and have movement of translation, to which is attached said flexible element, said member being formed with a surface over which said flexible element is flexed when the rotating member is rotated, which surface is curved so as to gradually approach the axis of rotation of the rotating member from the place of attachment of said flexible element to the rocking member.

AUGUSTUS F. KLASING.